United States Patent [19]
Hoffmann

[11] 3,986,357
[45] Oct. 19, 1976

[54] CONTROL DEVICE FOR A DRIVING UNIT COMPRISING AN INTERNAL COMBUSTION ENGINE AND A HYDROSTATIC TRANSMISSION

[75] Inventor: Helmuth Hoffmann, Bensberg-Steinacker, Germany

[73] Assignee: Klockner-Humboldt-Deutz Aktiengesellschaft, Cologne, Germany

[22] Filed: Oct. 20, 1975

[21] Appl. No.: 623,783

[30] Foreign Application Priority Data
Oct. 29, 1974 Germany............................ 2451204

[52] U.S. Cl.................................. 60/431; 60/444.1; 60/447.1; 60/449; 60/468; 60/490
[51] Int. Cl.²........................................ F16H 39/46
[58] Field of Search ............ 60/431, 433, 434, 445, 60/447, 449, 450, 468, 488

[56] References Cited
UNITED STATES PATENTS

| | | | |
|---|---|---|---|
| 3,167,907 | 2/1965 | Kempson........................ | 60/444 X |
| 3,214,911 | 11/1965 | Kempson........................ | 60/450 X |
| 3,477,225 | 11/1969 | Cryder et al..................... | 60/433 |
| 3,533,234 | 10/1970 | Futamata et al................ | 60/444 |

Primary Examiner—Edgar W. Geoghegan
Attorney, Agent, or Firm—Walter Becker

[57] ABSTRACT

A control device for a driving unit which comprises an internal combustion engine and a hydrostatic vehicle transmission. The hydraulic adjusting members of the control unit are in response to a relief of pressure automatically by spring force moved to their starting position and are connected to a control circuit which is connectable to the pressure line of a constant delivery pump and is also by a control member connectable to a fluid return line for purposes of setting a control pressure. An adjustable measuring orifice of a limit load control is arranged in the above mentioned pressure line and, when looking in flow direction, is located ahead of the connection of the control member. The control member of the adjustable orifice is connected, for instance, to the gas pedal of the internal combustion engine. A check valve is arranged in a conduit extending from the limit load control to the control circuit of the hydrostatic transmission. In response to the setting of the control member to the maximum possible control pressure, the control circuit is in continuous communication with the return line through a predetermined throttling cross section.

2 Claims, 1 Drawing Figure

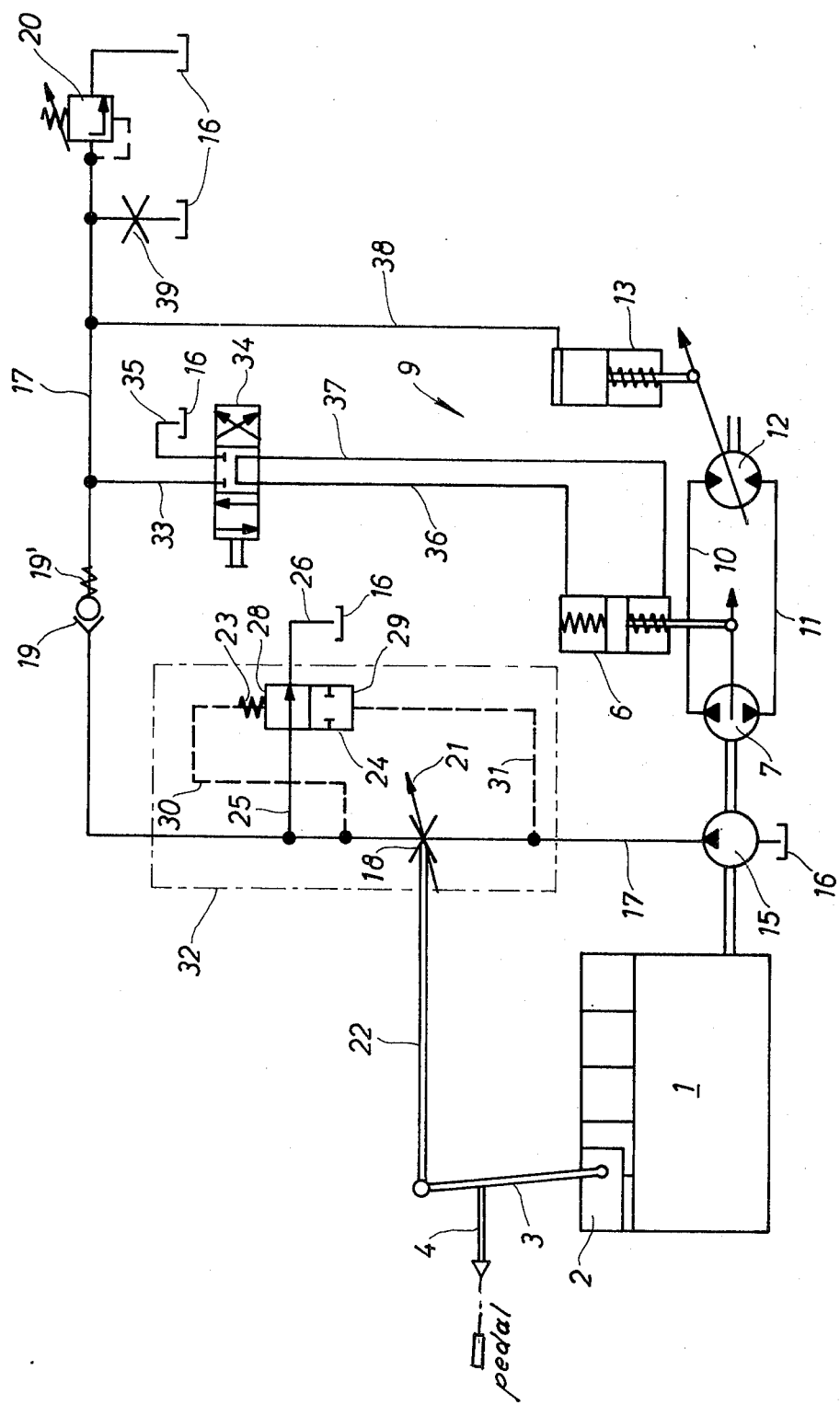

CONTROL DEVICE FOR A DRIVING UNIT COMPRISING AN INTERNAL COMBUSTION ENGINE AND A HYDROSTATIC TRANSMISSION

The present invention relates to a control device for a drive unit comprising an internal combustion engine and a hydrostatic transmission. Hydraulic adjusting elements thereof are adjusted in response to a pressure relief automatically by spring force in the direction toward the starting position and are connected to a control circuit. The circuit is connectable by a control member to a return line with the pressure line of a constant delivery pump and also for purposes of adjusting a control pressure.

In the pressure line, when looking in flow direction, ahead of the connection of the control member there is arranged an adjustable orifice of a limit load control having a control element connected for instance to the gas pedal of the internal combustion engine.

With a control device of the above mentioned type, changes in the load of the internal combustion engine during the operation are ascertained in the limit load control by measuring and comparing the rated and actual values of the speed. By means of the ascertained values of comparison, the control pressure is affected in the control system of the hydrostatic transmission in a continuous manner so that the transmission ratio of said transmission is always adapted to the condition of load acting on the internal combustion engine.

If, for purposes of acceleration, the speed of the internal combustion engine is to be increased, the governor of the internal combustion engine and simultaneously the measuring orifices of the limit load control is adjusted by the rated value control member. This member can be for instance the gas pedal, inasmuch as the limit load control ascertains the value of comparisons between rated and actual values of the speed. With the increase in the rated value a deviation from the temporary actual value occurs. In this instance the control circuit of the hydrostatic transmission is influenced in such a manner that first the opposite of the acceleration, namely a reduction in the driving speed occurs.

It is an object of the present invention to avoid the above outlined drawback and to improve a control device of the above mentioned type. Thus with a step-wise adjustment of the governor of the internal combustion engine in the direction toward an increase in the speed, there is avoided any influence upon the control pressure for the adjustment of the hydrostatic transmission in the direction toward reducing the driving speed.

This object and other objects and advantages of the invention will appear more clearly from the following specification in connection with the accompanying drawing diagrammatically illustrating a control device according to the present invention.

The control device according to the present invention is characterized primarily in that in the conduit which extends from the limit load control to the control circuit of the hydrostatic transmission there is provided a check valve. The device according to the invention is furthermore characterized in that the control circuit, when adjusting the control member to the maximum positive control pressure, continuously communicates with the return line through a predetermined throttling cross section. Due to this arrangement, any pressure relief at the adjusting elements of the hydrostatic transmission through the limit load control is excluded, and consequently the dropping of the driving speed when accelerating the vehicle is safely avoided.

According to a further development of the invention, a throttle is additionally provided which is arranged in parallel to the control member which serves for adjusting the control pressure.

Referring now to the drawing in detail, the drawing shows an internal combustion engine 1 in the form of a Diesel motor which has a speed governor 2 for controlling the quantity of fuel to be injected. The governor 2 is through a linkage system 3,4 connected to a non-illustrated pedal for adjusting the speed. Coupled to the internal combustion engine 1 is a hydropump 7 which is adjustable as to quantity and direction of delivery by means of a hydraulic adjusting cylinder-piston system 6. The hydropump 7 forms the primary part of an infinitely variable hydrostatic transmission 9. The hydropump 7 is through conduits 10 and 11 in a closed circuit connected to a hydromotor 12 which represents a secondary part of the hydrostatic transmission line. For purposes of adjusting the hydromotor 12 to the desired volume of delivery, said motor 12 is coupled to an adjusting cylinder-piston system 13. A constant delivery pump 15 driven in conformity with the speed of the internal combustion engine serves for supplying the control circuit of the hydraulic adjusting members 6 and 13. The constant delivery pump 15 has its suction side connected to a storage container 16 while its pressure side communicates with a pressure line 17 which through an adjustable measuring orifice 18, a check valve 19, and an adjustable pressure limiting valve 20 communicates with a return line, i.e. with the storage container 16. The check valve 19 is under the load of spring 19'. The orifice 18 has an adjusting member 21 which for purposes of its actuation is linked by a rod 22 to a linkage system 3. A two-way valve 24 which is continuously urged to its open position by a spring 23 is on one hand by means of conduit 25 connected to the conduit 17 behind the orifice 18 (when looking in the direction of flow) and on the other hand is by means of a conduit 26 connected to the storage container 16. The two end faces 28 and 29 of the two-way valve 24 are for purposes of controlling the same connected to the pressure line 17 through conduits 30 and 31 respectively ahead of and behind the orifice 18. The orifice 18 and the two-way valve 24 form structural elements of a limit load control 32. A conduit 33 branching off from the conduit 17 behind the check valve 19 communicates with a three-way valve 34 that is adjustable by hand. This three-way valve 34 is furthermore connected through a conduit 35 with the storage container 16 and through two conduits 36 and 37 with the adjusting cylinder-piston system 6. Furthermore, the pressure line 17 when viewing in flow direction behind the check valve 19 is connected to the adjusting cylinder-piston system 13 through a conduit 38. Moreover, a choke or throttle 39 is arranged in parallel to the pressure limiting valve 20.

During idling of the internal combustion engine 1, the adjusting member 21 of the orifice 18 is by means of rod 22 so adjusted that the quantity of pressure fluid delivered during the idling of the engine, by the pump 15 and the pressure acting as a result thereof upon the end face 29 of valve 24 will not be able to displace the valve 24 against the thrust of spring 23 to its closing position. If now the speed of the engine 1 is increased by pivoting linkage 3 in counterclockwise position, the rod 22 is displaced toward the left so that the adjusting member 21 of the orifice 18 is actuated in conformity with the adjusting stroke. As a result thereof, such a pressure occurs in the pressure conduit 17 ahead of the orifice 18 and in the adjacent conduit 31 and thus at the end face 29 of the slide 24 which eventually overcomes the thrust of spring 23 and the pressure acting upon the end face 28 and thus displaces the valve 24 to the closing position. The valve 24 thus blocks the conduit 25, and the pressure fluid delivered by the constant delivery pump 15 passes through the check valve 19 into the interior circuit of the two adjusting cylinder-piston systems 6 and 13. Due to the adjustment of the pressure limiting valve 20, a corresponding pressure for adjusting the hydropump 7 and hydromotor 12 can be set. The three-way valve 34 serves for preselecting the position of the delivery device of the hydropump 7 and is adjusted in conformity with the desired driving direction of the vehicle.

When the internal combustion engine 1 is under high load and the speed drops accordingly, the quantity of delivery of the constant delivery pump drops so that the pressure in the conduits 17, 31 drops in flow direction ahead of the orifice 18 and thus also at the end face 29 of the valve 24. The valve 24 is opened by the pressure acting upon its end face 28 and by the thrust of spring 23 so that the pressure line 17 is through conduits 25, 26 and the valve 24 directly connected to the return line 16. With this control position of the valve 24, no pressure fluid passes any longer through the check valve 19 to the following control circuit. However, through the throttle 39, continuously a predetermined quantity of pressure fluid flows off to the pressure fluid storage container 16 so that also the pressure drops in the control circuit. The two control systems 6 and 13 pivot the hydropump 7 and the hydromotor 12 to a lower transmission ratio whereby again a normal load will act upon the internal combustion engine 1 and the latter will again have the predetermined speed. Due to the again increased speed of the engine 1, also the delivery of the constant delivery pump 15 is increased again to such an extent that the pressure acting at the valve 24 upon the end face 29 displaces the valve 24 in a closing direction. Through the check valve 19, again pressure fluid passes into the following control circuits, and the pressure increases in said last mentioned circuit to a value which results in a transmission ratio which corresponds to the respective set output of the internal combustion engine 1.

If for purposes of accelerating the vehicle, the gas pedal is pivoted, immediately the rated value adjustment of the speed control 2 of engine 1 and of the orifice 18 of the limit load control 32 changes without these changes being counteracted by a like stepwise change in the actual speed of the internal combustion engine 1. Due to this rated value-actual value deviation, the valve 24 of the limit load control 32 will open in the above described manner. In view of the arrangement of the check valve 19, no pressure fluid can from the control circuit following said check valve 19 escape through the valve 24 to the return line so that the pressure in the control circuit will not drop in conformity with the characteristic of the limit load control 32 but in conformity with the characteristic of the throttle or choke 39. The throttle or choke 39 is expediently so dimensioned that with an acceleration of the vehicle, the increase in the speed of the internal combustion engine 1 is greater than the increase in the transmission ratio of the hydrostatic transmission 9 by the displacement of pressure fluid from the control circuit through the throttle or choke 39. In this way, it will be assured that the internal combustion engine 1 will quickly reach the newly predetermined speed and that the vehicle will during the transition period accelerate nevertheless as predetermined.

By varying the spring 19' on the check valve 19 and by adjusting the throttle or choke 39 and the limit load control 32, the control characteristic of the control circuit can be varied within wide limits so that in particular a vibration-free operation will be assured.

When the linkage 3, 4 is returned from its position of operation to its starting position, also the adjusting member 21 of the orifice 18 is pivoted to the illustrating starting position. In view of the thereby dropping speed of the internal combustion engine 1 and of the constant delivery pump 15, the pressure at the end face 29 of valve 24 drops and valve 24 opens. Thus, no pressure fluid passes any longer through the check valve 19 into the control circuit of the hydrostatic transmission 9 which control circuit follows flow through said valve 19. In view of the throttle or choke 39, the pressure in the control circuit drops, and the two adjusting cylinder-piston systems 6 and 13 pivot the hydromotor 7 as well as the hydropump 12 to their normal starting position.

It is, of course, to be understood that the present invention is, by no means, limited to the specific showing in the drawing, but also comprises any modifications within the scope of the appended claims.

What I claim is:

1. A control device for use in combination with a driving unit comprising an internal combustion engine and a hydrostatic vehicle transmission, which includes: a constant delivery pump, a pressure line connected to the pressure side of said constant delivery pump, said hydrostatic transmission including hydraulic control means for controlling said hydrostatic transmission, means associated with said hydraulic control means for continuously urging the same to a first position representing the starting position of said hydraulic control means and operable in response to a relief of pressure in said hydraulic control means to move the latter to said starting position, branch conduit means branching off from said pressure line and leading to said hydraulic control means, a limit load control arranged in said pressure line and including an adjustable measuring orifice connected to said pressure line ahead of the branching off point of said branch conduit means when looking in the direction of flow of pressure fluid from said constant delivery pump, a control element associated with said adjustable measuring orifice and operatively connectable to said internal combustion engine, a check valve interposed in said pressure line between said adjustable orifice and the branching off point of said branch conduit means, and adjustable pressure limiting valve means arranged in said pressure line past the branching off point of said branch conduit means when looking in the direction of flow of fluid in said pressure line, said pressure limiting valve means having an outlet for communication with the suction side of said constant delivery pump.

2. A control device according to claim 1, which includes a branch line branching off from said pressure line behind said branching off point of said branch conduit means for said control means, and adjustable throttle means arranged in said branch line and having an outlet for communication with the suction side of said constant delivery pump.

* * * * *